Patented July 31, 1928.

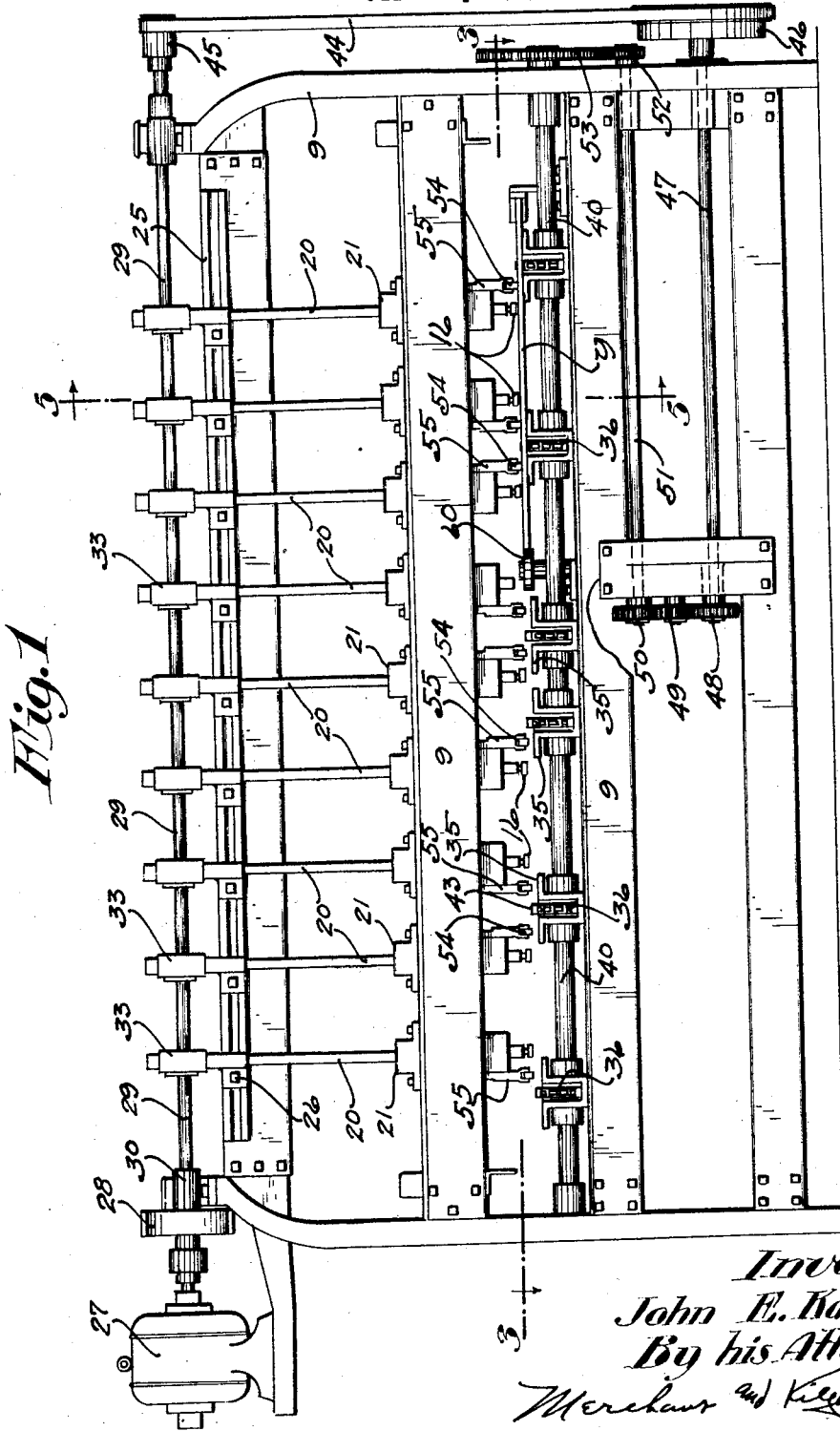

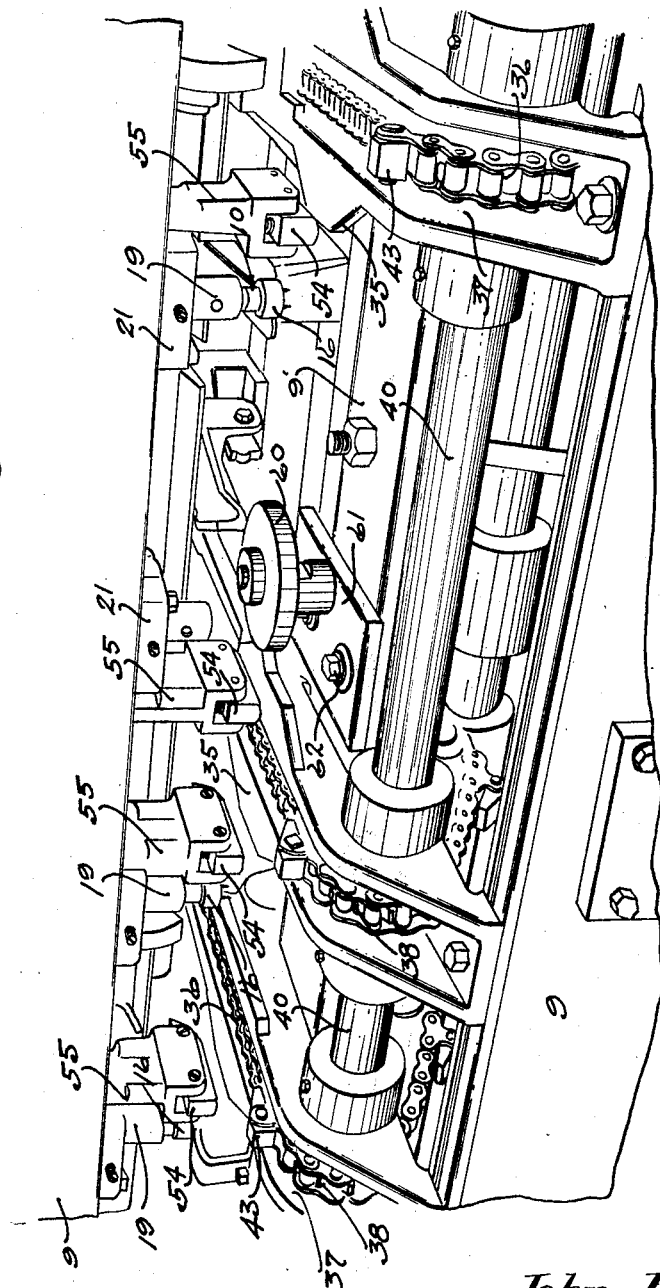

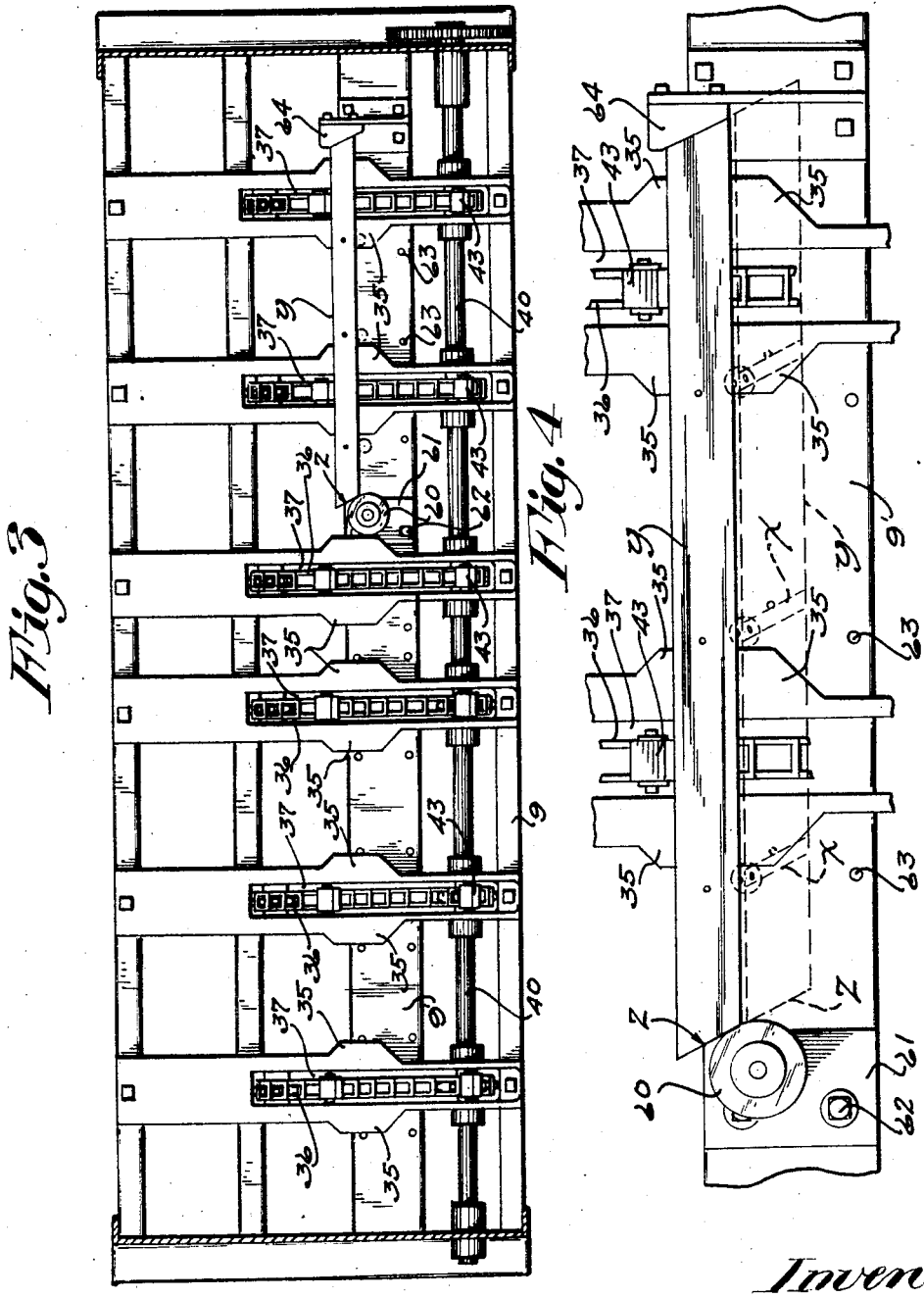

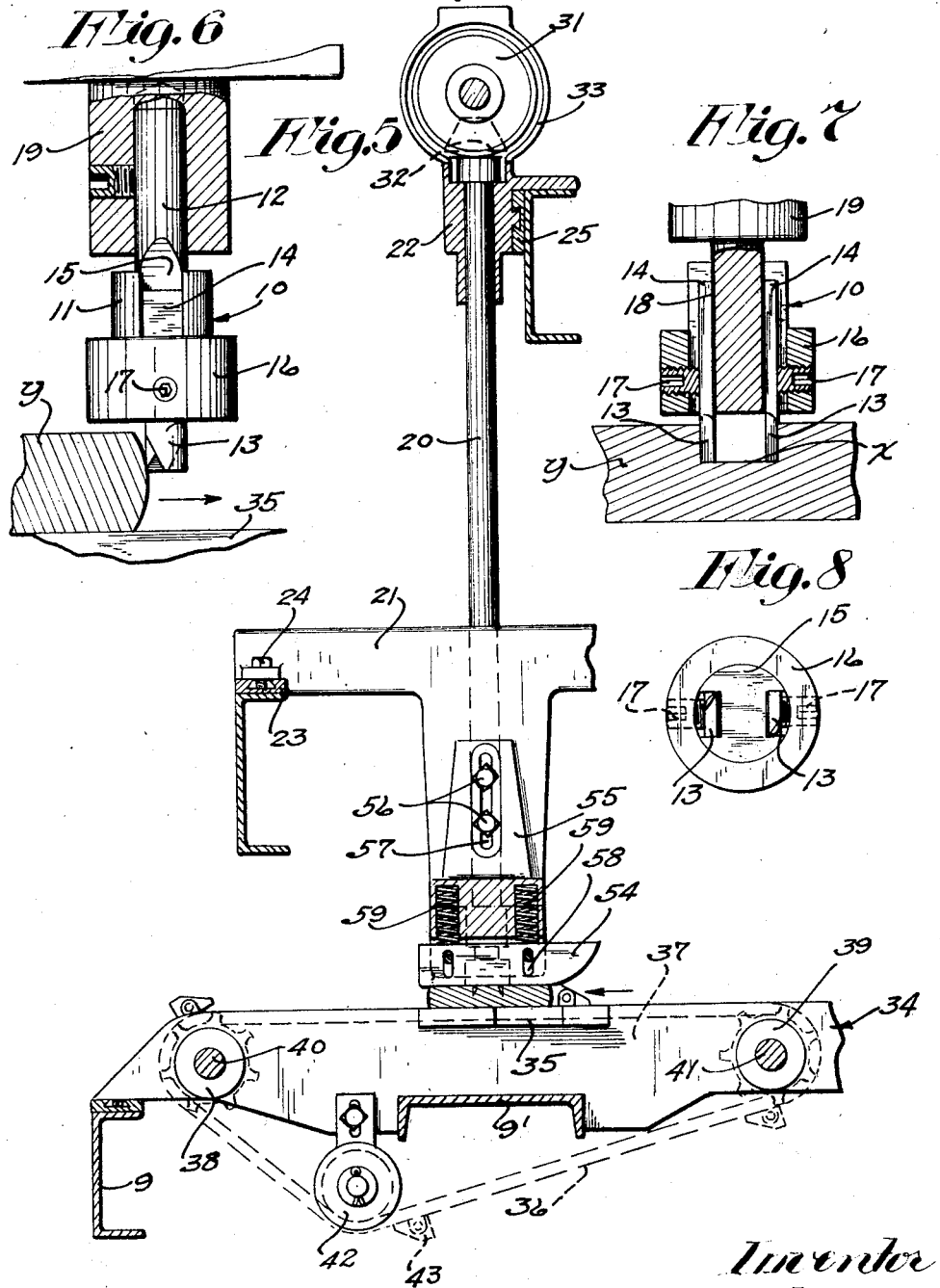

1,678,814

UNITED STATES PATENT OFFICE.

JOHN E. KALGREN, OF MINNEAPOLIS, MINNESOTA, ASSIGNOR TO THE J. R. CLARK COMPANY, OF MINNEAPOLIS, MINNESOTA, A CORPORATION OF MINNESOTA.

ROUTING MACHINE.

Application filed September 17, 1927. Serial No. 220,274.

My present invention relates to a routing machine, and has for its primary object the provision of such a machine especially adapted for cutting grooves in the side bars of a step ladder for the steps thereof.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a front elevation of the routing machine;

Fig. 2 is a fragmentary perspective view of the routing machine;

Fig. 3 is a view partly in plan and partly in horizontal section taken on the line 3—3 of Fig. 1;

Fig. 4 is a fragmentary plan view of certain of the parts shown in Fig. 3, on an enlarged scale, and with some parts shown in different positions by means of broken lines;

Fig. 5 is a fragmentary view principally in section taken on the line 5—5 of Fig. 1;

Fig. 6 is a side elevation of one of the routers;

Fig. 7 is a view of one of the routers with some parts shown in central vertical section; and Fig. 8 is a bottom plan view of one of the routers.

The numeral 9 indicates the frame of a routing machine and which machine includes a plurality of routers 10 mounted to rotate about vertical axes, and laterally spaced transversely of the machine. Each router 10 comprises a cylindrical head 11 having an upstanding shank 12 and a pair of opposite cutters 13 that extend below said head. These cutters 13 have relatively wide, flat shanks 14 removably mounted in groove-like seats 15 in the sides of said head. Surrounding the head 11 is a wide collar 16 having a pair of screws 17, which impinge against the cutter shanks 14 and rigidly hold the same in the seats 15. By inserting shims 18 under the cutter shanks 14, the cutters 13 may be spaced different distances apart for cutting grooves of different widths. It will be noted that the vertical cutting edges of the cutters 13 are rearwardly inclined to produce a drawing action, under the rotation of the routers, and thereby make clean cuts without chipping or splintering the work.

The router shanks 12 are removably mounted in centering chucks 19 on the lower ends of vertical shafts 20, the lower end portions of which are journaled in bearings in laterally spaced bridge bars 21 and the upper ends of which are journaled in bearings 22. The bridge bars 21 extend from the front to the rear of the machine and are supported on front and rear fixed rails 23 on the frame 9. These bridge bars 21 have dove-tailed interlocking engagement with the rails 23 for lateral sliding movement thereon transversely of the machine, and are held by screws or bolts 24 where adjusted thereon. The bearings 22 have dove-tailed interlocking engagement with the rail 25 and frame 9 and are held by screws or bolts 26 where adjusted thereon. Obviously, by adjusting the bridge bars 21 and the bearings 22, the routers 10 may be independently adjusted laterally transversely of the machine.

The shafts 20 and hence the router 10 are rotated at the desired speed from an electric motor 27 mounted on the frame 9 and connected by a clutch 28, diagrammatically illustrated, to one end of a long horizontal shaft 29 which extends transversely of the machine at the top thereof. This shaft 29 is journaled in bearings 30 on the frame 9 and has keyed thereto bevel gears 31 which mesh with bevel pinions 32 on the upper ends of the shafts 20. Each gear 31 and its co-operating pinion 32 is mounted in a case 33 on the respective bearing 22. In addition to the bearings 30 the shaft 29 is journaled in the cases 33. The gears 31 are adjustable on the shaft to move with the bearings 22.

Below the routers 10 is a horizontal bed comprising a plurality of laterally spaced relatively wide members 34 that extend from the front to the rear of the machine and bolted to the frame 9. These bed members 34 have widened intermediate sections 35, for a purpose that will presently appear.

As previously stated, the machine illustrated is especially designed for use in cutting grooves $x$ in the opposing faces of step ladder side bars $y$ for the steps thereof, as best shown by full and broken lines in Fig. 4. The floor-engaging ends of the side bars $y$ are cut oblique, as indicated at $z$ so as to engage a floor throughout the full width of said bars, which as is well known, are in an inclined position when assembled in a step ladder. These oblique ends z act as gauges as will presently appear, in moving the side bars y endwise during their edgewise travel through the machine to the routers 10 to cause said routers to cut the grooves x parallel to said ends, as will presently appear, so that the steps of the step ladder, when mounted in said grooves, will be transversely level.

To feed the step ladder side bars y edgewise to the routers 10, there is provided a plurality of sprocket chains 36 mounted in longitudinally extended grooves 37 in the bed members 34. These sprocket chains 36 run over pairs of front and rear sprocket wheels 38 and 39, respectively, the former of which are keyed to a driven shaft 40 and the latter of which are keyed to an idle shaft 41. The shafts 40 and 41 are journaled in the end members of the frame 9 and the bed members 34. The sprocket wheels 38 and 39 are arranged to cause the upper sections of the sprocket chains 36 to travel parallel to the upper faces of the bed members 34 with their outer faces substantially flush with the upper faces of said members, as best shown in Fig. 5. For each sprocket chain 36 is a flanged idle slack take-up roller 42 adjustably mounted on the respective bed member 34 and extends therebelow, as shown in Fig. 5.

Each sprocket chain 36 is provided with a plurality of longitudinally spaced abutments 43 and it is important to note, by reference to Fig. 3, that corresponding abutments 43 are aligned transversely of the machine. By reference to Fig. 3 it will be noted that the routers 10 are located midway between the shafts 40 and 41 and midway between the ends of the bed sections 35. The bed members 34, below their sections 35 are reinforced by a heavy inverted channel bar 9' which forms a portion of the frame 9.

The routers 10 are driven at a high speed from the motor 27 and the chains 36 are operated at a relatively slow speed from the shaft 29 by the following connections, to wit:

A belt 44 runs over a small pulley 45 on the opposite end of the shaft 29 from the motor 27 and a large pulley 46 on the outer end of a shaft 47 journaled in bearings on the frame 9 and having on its inner end a spur gear 48 which meshes with an idle intermediate spur gear 49 on said frame and which gear 49 meshes with a spur gear 50 on the inner end of a counter shaft 51 journaled in bearings on the frame 9 and having on its outer end a relatively small spur gear 52 which meshes with a large spur gear 53 on the driven shaft 40.

The side bars y are completely finished ready to be assembled in step ladders, with the exception of the step grooves x, at the time they are fed through the routing machine. To feed the side bars y to the routers 10, the operator places the same flatwise on the bed members 34 with their front longitudinal edges turned rearward so as to be engaged by the following abutments 43 and with their rear longitudinal edges turned toward the routers 10 so that when said side bars are engaged by said abutments, they will be moved thereby on the bed members 34 to the routers 10.

To hold the side bars y on the bed members 34 during the action of the routers 10 thereon, there is provided a plurality of spring pressed shoes 54 located directly over certain of the bed extensions 35. These shoes 54 extend parallel to the sprocket chains 46 and have curved rear ends and are mounted in the bifurcated lower ends of brackets 55 rigidly secured to certain of the bridge members 21, for vertical adjustment, by pairs of bolts 56 which extend through vertical slots 57 in said brackets. These shoes 54 are securely held against lateral movement by the brackets 55 and are attached thereto by slot and pin connections 58 which permit limited raising and lowering movements of said shoes over the respective bed sections 35. Pairs of coiled springs 59 compressed between the tops of the shoes 54 and seats in the brackets 55 yieldingly hold the shoes 54 in their lowermost positions so that they are normally spaced above the bed members 34 a distance slightly less than the thickness of the side bars y. At the time one of the side bars y is moved into contact with the curved rear ends of the shoes 54 it lifts said shoes and passes thereunder. This lifting of the shoes 54 places the springs 59 under further tension so that said shoes firmly press and hold said side bar on the bed member 34.

In the present adjustment of the machine, the side bars y are placed on the bed members 34 with their ends z turned to the left and in respect to an operator at the back of the machine facing the routers 10, as best shown in Fig. 4. To cause the side bars y to be moved edgewise on the bed members 34 during the action of the routers 10 thereon, there is provided a loose wheel 60 journaled on a bearing plate 61 to rotate in the plane of the side bar y and be engaged by the end z thereof. This bearing plate 61 is detachably secured to the channel beam 9' for longitudinal adjustment therein by a pair of bolts 62 adapted to be screwed into any one pair of a plurality of pairs of tapped bores 63 in said beam. This adjustment of the bearing plate 61 permits the wheel 60 to be set in different positions transversely of the machine for step ladder side bars of different lengths.

In placing one of the side bars y on the bed members 34 it is so endwise positioned that the heel of its oblique end $z$ engages the periphery of the wheel 60 off center to the left and is cammed thereby to impart an endwise movement to the side bar $y$ to the left. By the time the oblique end $z$ is tangent to the wheel 60, as shown by full lines in Fig. 4, the routers 10 engage the side bar $y$ at the front longitudinal edge thereof and start their cutting action to form the grooves $x$. When the toe of the oblique end $z$ is just about ready to pass out of engagement with the wheel 60, as shown by dotted lines in Fig. 4, the routers 10 have finished cutting the grooves $x$. During the cutting action of the routers 10, the side bar $y$ has been moved endwise by its oblique end $z$ acting on the wheel 60 as a gauge so that the grooves $x$ are parallel to said oblique end.

At the completion of the cutting of the grooves $x$, the side bar $y$ passes from under the shoes 54 and is carried by the chains 36 to the curved front ends of the bed members 34 where they are discharged from the machine. During the cutting of the grooves $x$ the shoes 54 have firmly held the side bar $y$ on the bed members 34.

The upper end of the side bar $y$ is also cut oblique parallel to the end $z$ to support and hold the top step of the step ladder. An abutment 64 is secured to the channel beam 9' and arranged to engage the left hand end of the side bar $y$ and hold its gauge end $z$ in contact with the wheel 60 during the cutting of the grooves $x$ in said side bar. The side bar $y$, illustrated in the drawings, is for the left hand side of a step ladder. The right hand side bars may be run through the other end of the machine and, of course, a wheel like the wheel 60 and an abutment like the abutment 64 will be provided but in reverse order.

When side bars are being run through the machine having a length more than one-half of the width of the present machine, it will be necessary to cut the grooves $x$ first in the side bars for one side of a step ladder and then reverse the order of the wheel 60 and abutment 64 and run the side bars for the other side of the step ladder through said machine.

What I claim is:

1. A routing machine comprising a router, a feeding device for moving a piece of work having a gauge surface to the router, and a device arranged to be engaged by said surface to cause the work to move transversely of the movement imparted thereto by the feeding device.

2. The structure defined in claim 1 in further combination with an abutment arranged to hold the work with its gauge surface positioned to be acted on by the device.

3. A routing machine comprising a router, a feeding device for moving a piece of work having a gauge surface to the router, and a wheel arranged to be engaged by said surface to cause the work to move transversely of the movement imparted thereto by the feeding device.

4. A routing machine comprising a router, a feeding device for moving a piece of work having a gauge surface to the router, and a wheel arranged to turn in the plane of the work and be engaged by said surface to cause the work to move transversely of the movement imparted thereto by the feeding device.

5. The structure defined in claim 4 in further combination with an abutment arranged to hold the work with its gauge surface engaging the wheel.

6. A routing machine comprising a bed, a router working over the bed, a yieldingly held shoe for holding a piece of work having a gauge surface on the bed, a feeding device for moving the work to the router, a wheel arranged to turn in the plane of work and be engaged by said surface to cause the work to move transversely of the movement imparted thereto by the feeding device, and an abutment arranged to hold the work with its gauge surface engaging the wheel.

7. A routing machine for cutting grooves in the side bars of step ladders for the steps thereof comprising a router, a feeding device for moving a step ladder side bar edgewise to the router, said side bar having a transversely oblique floor-engaging end, and a wheel arranged to be engaged by said oblique floor-engaging end of the side bar to cause said side bar to move endwise during the action of the router therein to cut a groove for a step parallel to the oblique floor-engaging end of the side bar.

8. The structure defined in claim 7 in further combination with an abutment arranged to be engaged by the other end of the side bar to hold the oblique floor-engaging end of the side bar against the wheel.

9. The structure defined in claim 7 in which the router includes a revoluble head having a pair of diametrically opposite cutters having inclined cutting edges.

10. The structure defined in claim 7 in which the router includes a revoluble head having a pair of diametrically opposite cutters having inclined cutting edges, said cutters being mounted for lateral adjustment in respect to each other.

In testimony whereof I affix my signature.

JOHN E. KALGREN.